United States Patent
Klein et al.

(10) Patent No.: US 11,622,046 B2
(45) Date of Patent: Apr. 4, 2023

(54) SYSTEM FOR CLOUD-ENABLING A PREMISE PBX

(71) Applicant: Intermedia.net, Inc., Mountain View, CA (US)

(72) Inventors: Daniel Klein, Mountain View, CA (US); Maria Ruinskaya, Mountain View, CA (US); Anatoly Kanashin, Mountain View, CA (US); Douglas Christiansen, Mountain View, CA (US)

(73) Assignee: Intermedia.net, Inc., Sunnyvale, CA (US)

( * ) Notice: Subject to any disclaimer, the term of this patent is extended or adjusted under 35 U.S.C. 154(b) by 7 days.

(21) Appl. No.: 17/215,489

(22) Filed: Mar. 29, 2021

(65) Prior Publication Data
US 2022/0311866 A1    Sep. 29, 2022

(51) Int. Cl.
*H04M 7/00* (2006.01)
*H04L 65/1073* (2022.01)
(Continued)

(52) U.S. Cl.
CPC ........ *H04M 7/009* (2013.01); *H04L 65/1069* (2013.01); *H04L 65/1073* (2013.01); *H04L 65/1104* (2022.05); *H04M 7/0096* (2013.01)

(58) Field of Classification Search
CPC . H04M 7/009; H04M 7/0096; H04L 65/1069; H04L 65/1073; H04L 65/1104
See application file for complete search history.

(56) References Cited

U.S. PATENT DOCUMENTS

| | | | |
|---|---|---|---|
| 9,661,143 B1* | 5/2017 | Okita | H04M 3/42331 |
| 2010/0002662 A1* | 1/2010 | Schmidt | H04W 88/085 |
| | | | 370/352 |

(Continued)

FOREIGN PATENT DOCUMENTS

| | | |
|---|---|---|
| CN | 107302452 A | 10/2017 |
| JP | 2017011575 A | 1/2017 |
| WO | WO-2022212277 A1 | 10/2022 |

OTHER PUBLICATIONS

"International Application Serial No. PCT/US2022/022181, International Search Report dated Jul. 21, 2022", 3 pgs.

(Continued)

*Primary Examiner* — Steven H Nguyen
(74) *Attorney, Agent, or Firm* — Schwegman, Lundberg & Woessner, P.A.

(57) ABSTRACT

In an example embodiment, a solution that allows a PBX to utilize bridged mobile or desktop applications for collaboration and softphone use is provided. The solution works in conjunction with existing hardwired PBX devices without requiring additional hardware such as an edge router to be integrated with the PBX hardware. Incoming calls are able to ring a user's hardwired device, such as a desk phone at an office, while simultaneously ring mobile device or desktop applications (apps). App users can place outbound PSTN calls and dial PBX extensions just as if they were using their hardwired device. Additionally, PSTN services are utilized from the existing PBX rather than bypassing the existing PBX, which makes tracking and billing more straightforward. A Session Initiation Protocol (SIP) tie trunk is used between the existing PBX and a software bridge controller.

20 Claims, 11 Drawing Sheets

(51) Int. Cl.
     *H04L 65/1069*     (2022.01)
     *H04L 65/1104*     (2022.01)

(56)            References Cited

U.S. PATENT DOCUMENTS

2010/0162034 A1     6/2010  Degenhardt et al.
2012/0170725 A1*    7/2012  Ramanathan .......... H04M 3/46
                                                    379/93.01
2016/0119179 A1     4/2016  Palmer et al.
2018/0083830 A1*    3/2018  Pendleton ........... H04L 41/5096
2019/0320070 A1*   10/2019  Adams ............... H04M 3/4234

OTHER PUBLICATIONS

"International Application Serial No. PCT/US2022/022181, Written Opinion dated Jul. 21, 2022", 4 pgs.

* cited by examiner

SYSTEM FOR CLOUD-ENABLING A PREMISE PBX

TECHNICAL FIELD

This application relates generally to telephone networks. More specifically, this application relates to a System for Cloud-Enabling a Premise PBX for a telephone network.

BACKGROUND

Many organizations utilize a private branch exchange (PBX) to manage telephone calls within the organization. Users of a PBX can communicate internally and externally. External communications can be handled using analog telephone networks such as public switched telephone networks (PSTNs), using digital networks such as T1 or Packet networks such as Voice over IP (VoIP) networks. A PBX allows an organization to have more phones and other devices such as fax machines than physical phone lines, and provides features such as transferring calls, voice mail, call recording, interactive voice menus, and call queues.

Each device connected to a PBX is referred to as an extension and has a designated extension telephone number. The devices, however, are all physically connected to the PBX, through physical telephone or networking cables and line cards or Ethernet ports. As more and more users opt to utilize cellular/smart phones for calls, at least partially, the traditional PBX is in danger of being outdated.

Some solutions are available to allow users to utilize cellular/smart phones for calls and have these phone integrated into the PBX to allow functionality such as forwarding a call from an internal physically connected telephone within the PBX to a cell phone, but call forwarding does not integrate the mobile or other device into the PBX. The mobile or other device just becomes a dumb endpoint to receive a call, and has no mid-call control features. The mobile or other device also cannot place a call as if it were a part of the PBX. What is needed is a solution that allows organizations to extend PBX functionality to cellular or smart devices.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and machine-readable media (e.g., computing machine program products) that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In an example embodiment, a solution that allows a PBX to utilize bridged mobile or desktop applications for collaboration and softphone use is provided. The solution works in conjunction with existing hardwired PBX devices without requiring additional hardware such as an edge router to be integrated with the PBX hardware.

In an example embodiment, incoming calls are able to ring a user's hardwired device, such as a desk phone at an office, while simultaneously ring mobile device or desktop applications (apps). App users can place outbound PSTN calls and dial PBX extensions just as if they were using their hardwired device. Additionally, PSTN services are utilized from the existing PBX rather than bypassing the existing PBX, which makes tracking and billing more straightforward.

In an example embodiment, the solution is accomplished by utilizing a Session Initiation Protocol (SIP) tie trunk between the existing PBX and a software bridge controller. This provides an integrated user experience with multiple devices that can be deployed virtually anywhere.

Configuration is accomplished by having the bridge controller assign two extensions to every cloud PBX user in order to support "find me" and "follow me" services for a PBX user. The bridge controller and the PBX are then configured to leverage the private SIP tie trunk over the Internet to pass calls between user devices. Specifically, the PBX system is configured to invoke simultaneous ring patterns to bridge apps when their PBX device receives PSTN or extension calls, so both phones and apps will ring at the same time. Cloud PBX users can extension dial PBX extensions and PSTN numbers. Calls route across the tie trunk. The outbound caller ID of the cloud PBX user application is configured to be the same as the corresponding PBX user caller ID.

Figure 1:
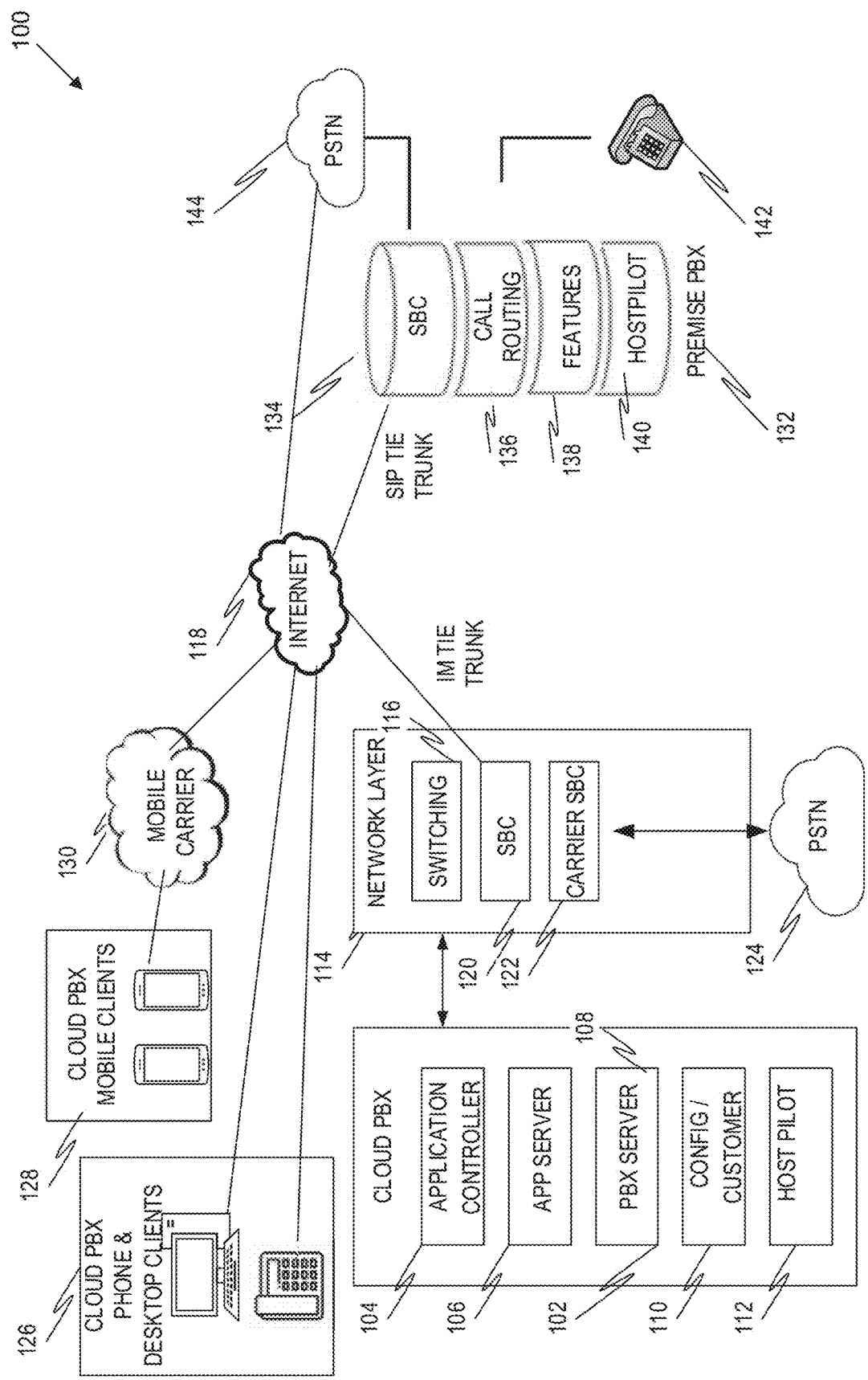
FIG. 1 is a block diagram illustrating a system for unified communications in accordance with an example embodiment.

FIG. 1 is a block diagram illustrating a system 100 for unified communications in accordance with an example embodiment. The term "unified communications" means that many different types of communications are handled through a single platform, including, for example, traditional phone calls (such as PBX and PSTN calls), presence tracking (such as tracking if employees are available for communications or not), chat and text functions, video conferencing, and file management. The unified communications platform may be referred to as aCloud PBX 102, and may include an application controller 104, app server 106, PBX server 108, configuration component 110, and voice control panel (VCP) 112. The application controller 104 acts to control one or more applications running on app server 106. It should be noted that app server 106 may actually be multiple app servers operating for different applications available as part of the unified communications platform, including potentially separate applications for voice communication, chat/text, video conferencing, and file management. PBX server 108 specifically handles call routing of calls. Configuration component 110 is where customer-specific configurations may be maintained and followed, and VCP 112 is a graphical user interface that can be used for setting up and/or editing the configurations.

The Cloud PBX 102 may connect to a network layer 114, which contains a switching component 116 that performs packet switching, as well as a session border controller (SBC) 120 that communicates with the Internet 118 via a SIP tie trunk. A separate carrier SBC 122 may communicate directly with a PSTN 124.

Users of the Cloud PBX 102 may maintain devices such as phone/desktop clients 126 and mobile clients 128. The phone/desktop clients 126 may connect directly through the Internet 118 via Ethernet or WiFi connections, for example, while mobile clients may communicate through the Internet 118 via a mobile carrier 130 (or directly via WiFi connections).

PBX 132 may maintain its own SBC 134, as well as a call routing component 136, features component 138, and portal 140. The features component 138 may offer various PBX features such as internal text and presence features. A user of the PBX 132 may have a hardwired client 142, and the PBX 132 may connect to a PSTN 144. Additionally, as will be described in more detail below, the PBX 132 may connect to the Internet 118 via a tie trunk.

Figure 2:
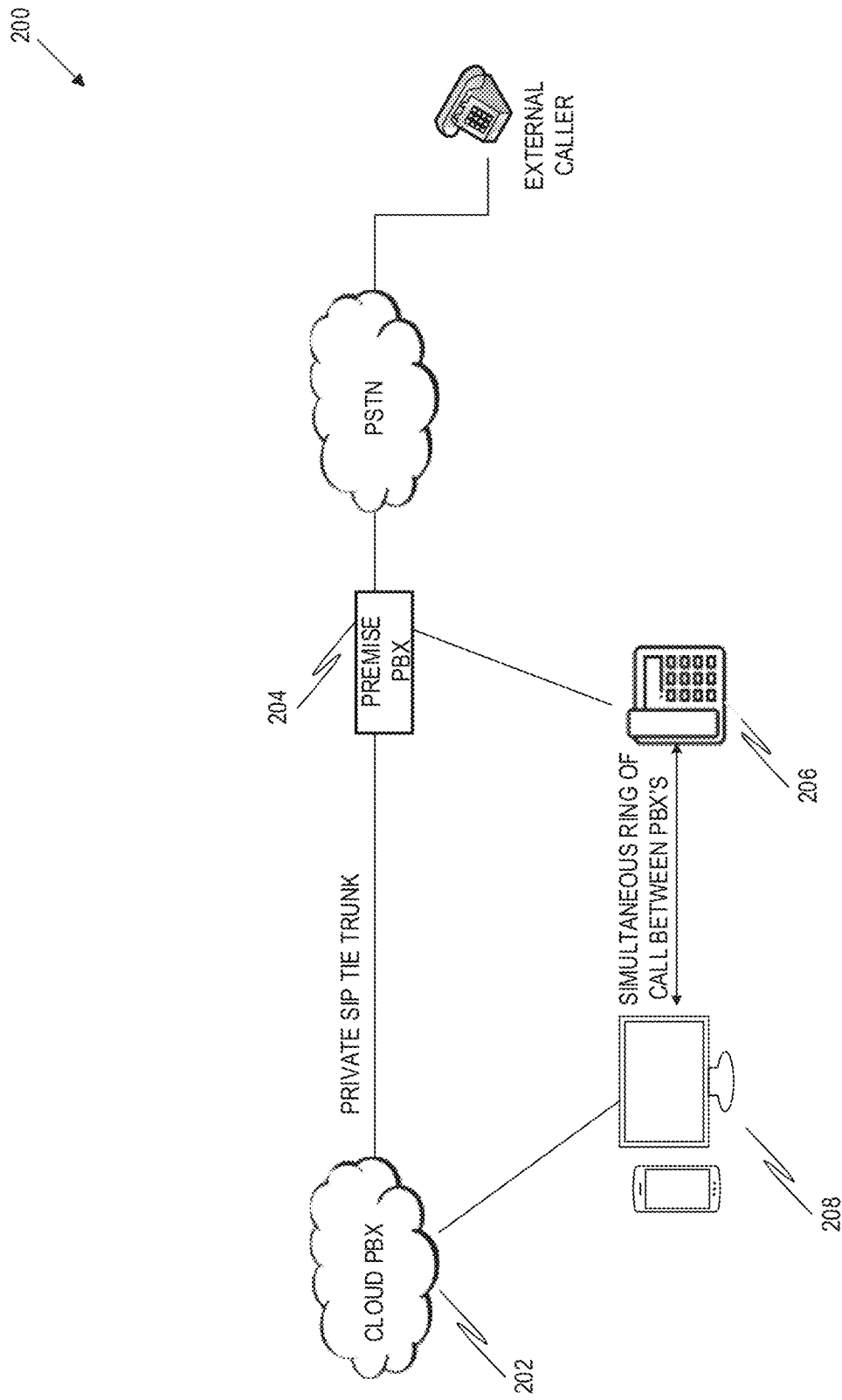
FIG. 2 is a block diagram illustrating a system for cloud-enabling a premise PBX system in accordance with an example embodiment.

FIG. 2 is a block diagram illustrating a system 200 for cloud-enabling a premise PBX in accordance with an example embodiment. The system 200 depicted is a simplified version of FIG. 1 to highlight key components in the bridging functionality. The system 200 includes a bridge controller 202, which may operate in a cloud environment. The bridge controller connects via a private SIP tie trunk to a premise PBX 204. A user may have one device 206, such as a desk phone, connected directly to the premise PBX 204 while also having another device 208, such as a desktop computer running a desktop app or a mobile device or phone running a mobile app, connected to the bridge controller through the Internet (and possibly through a cellular carrier). When another user calls this user, the system 200 enables both device 206 and device 208 to simultaneously ring.

Figure 3:
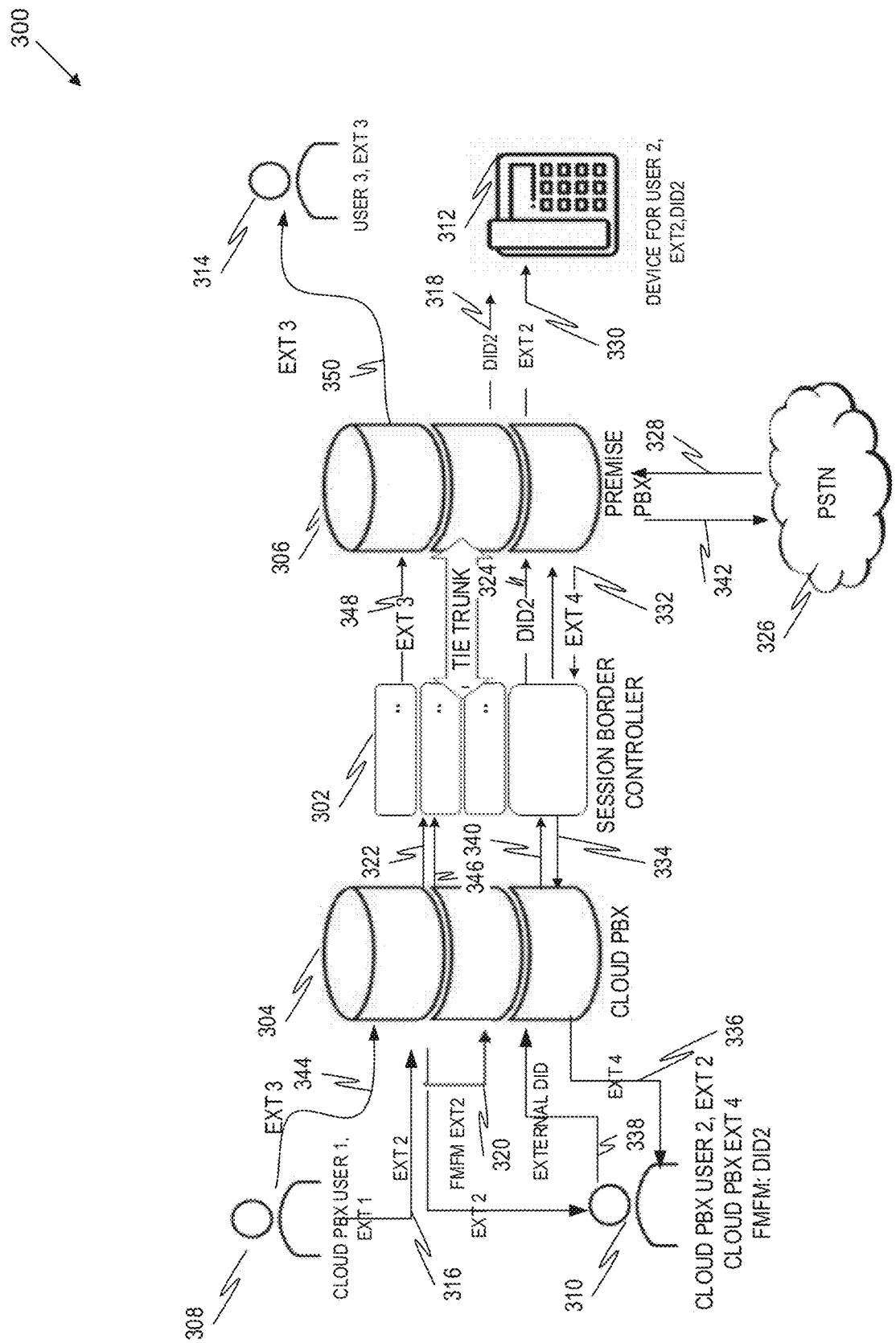
FIG. 3 is a block diagram illustrating a system for cloud-enabling a premise PBX system in accordance with another example embodiment.

The bridge controller 202 may actually comprise multiple components, including session border controllers and a Cloud PBX. FIG. 3 is a block diagram illustrating a system 300 for cloud-enabling a premise PBX in accordance with another example embodiment. Here, the system 300 includes session border controllers 302 and a Cloud PBX 304.

The session border controllers 302 act as an interface between the Cloud PBX 304 and premise PBX 306. Some of the configuration processes to enable the additional features described herein are performed by the session border controllers 302 and some are performed by the external PBX 304.

This diagram also depicts three users and four devices 308, 310, 312, 314. Device 308 is used by User1 and is connected to the Cloud PBX 304. No devices are depicted for User1 as being connected directly to premise PBX 306. While it is possible that User1 has such devices and they just aren't pictured, it is also possible that User1 simply does not have any device that would directly connect to the premise PBX 306 (such as might be the case if User1 was a fully remote or work-from-home worker). Devices 310 and 312 are used by User2. Device 310 is connected to the Cloud PBX 304 and device 312 is connected to the premise PBX 306. This might be the case where User2 works in an office having a desk phone (such as device 312), but also occasionally takes work calls on a mobile device (such as device 310). Device 314 is used by User3 and is connected to premise PBX 306. No devices are depicted for User3 as being connected directly to Cloud PBX 304. While it is possible that User3 has such devices and they just aren't pictured, it is also possible that User3 simply does not have any device that would directly connected to Cloud PBX 304 (such as a worker who only takes work calls on a desk phone at the office and doesn't take work calls on, or even doesn't own, a mobile device).

Line 316 represents User1 dialing the extension of User2 using device 308. This is sent to the Cloud PBX 304, which may look up User2 in a local routing table (local to Cloud PBX 304). That routing table may indicate that User2 maintains device 310 that connects directly to Cloud PBX 304 but also maintains a device that connects to Cloud PBX (the local routing table may be aware of what device 308 is, such as by having a device-specific ID for device 308, but may not have such information about device 310). If simultaneous ring has been enabled for User2's account, then Cloud PBX 304 sets forth to try to cause such simultaneous ringing. Line 318 represents Cloud PBX 304 ringing device 310. Line 320 represents Cloud PBX 304 issuing a find-me-follow-me (FMFM) command to EXT2. The local routing table informs the Cloud PBX 304 of the identification of PBX 308 where User2 maintains at least one other device. Line 322 represents Cloud PBX 304 contacting a session border controller 302 corresponding to the premise PBX 306, and line 324 represents the corresponding session border controller 302 contacting the premise PBX 306 through the SIP Tie Trunk line, with the DID command, premise PBX 306 then accesses its own internal local routing table to identify device 312 associated with User2, and sends the DID command to device 312 so that it simultaneously rings with device 310.

Also depicted is PSTN 326. Line 328 represents an incoming PSTN 326 call to the premise PBX 306 that rings User2. The goal is for this call to also ring devices 310 and 312 simultaneously, premise PBX 306 receives this call and looks up User2 in the local routing table, which informs it that User2 maintains device 312 directly connected to the premise PBX 306 and also maintains a device directly connected to the Cloud PBX 304. This local routing table may have the specific device ID for device 312, but may not be aware of the specific device ID for device 310. Line 330 represents premise PBX 306 ringing device 312 directly. Line 332 represents premise PBX 306 sending a call request to the corresponding session border controller 302, and line 334 represents the corresponding session border controller 302 forwarding this request to Cloud PBX 304 over the SIP Tie Trunk. Cloud PBX 304 then looks up its own local routing table to identify device 310 corresponding to User2, and then line 336 represents it sending the call to device 310 to ring simultaneously with device 312.

Line 338 represents User2 using device 310 to call an outside number accessible through PSTN 326. This Cloud DID call is passed to Cloud PBX 304, which looks up User2 in its local routing table to determine that indeed this Cloud DID call should be sent via the premise PBX 306 (technically it is not mandatory to do so, as it is possible that Cloud PBX 304 is directly connected to its own PSTN or even to PSTN 326, but it is beneficial to do so if User2 is a user of premise PBX 306 for tracking and/or billing purposes. As such, line 340 represents Cloud PBX sending the DID to the corresponding session border controller 302, which then sends it to premise PBX 306 (as represented by line 342), premise PBX 306 then makes the call over PSTN 326, as represented by line 342.

Line 344 represents User1 making a call using device 308 to User3, who operates device 314. Cloud PBX 304 looks up User3 in its local routing table and determines that User3 maintains a device on premise PBX 306. As such, line 346 represents Cloud PBX passing this call to the corresponding session border controller 302, which then passes it via the SIP Tie Trunk to premise PBX 306, as represented by line 348. Line 350 represents premise PBX 306 sending the call to device 314, where it will ring (without simultaneous ringing, since User3 has no other device registered).

Figure 4:
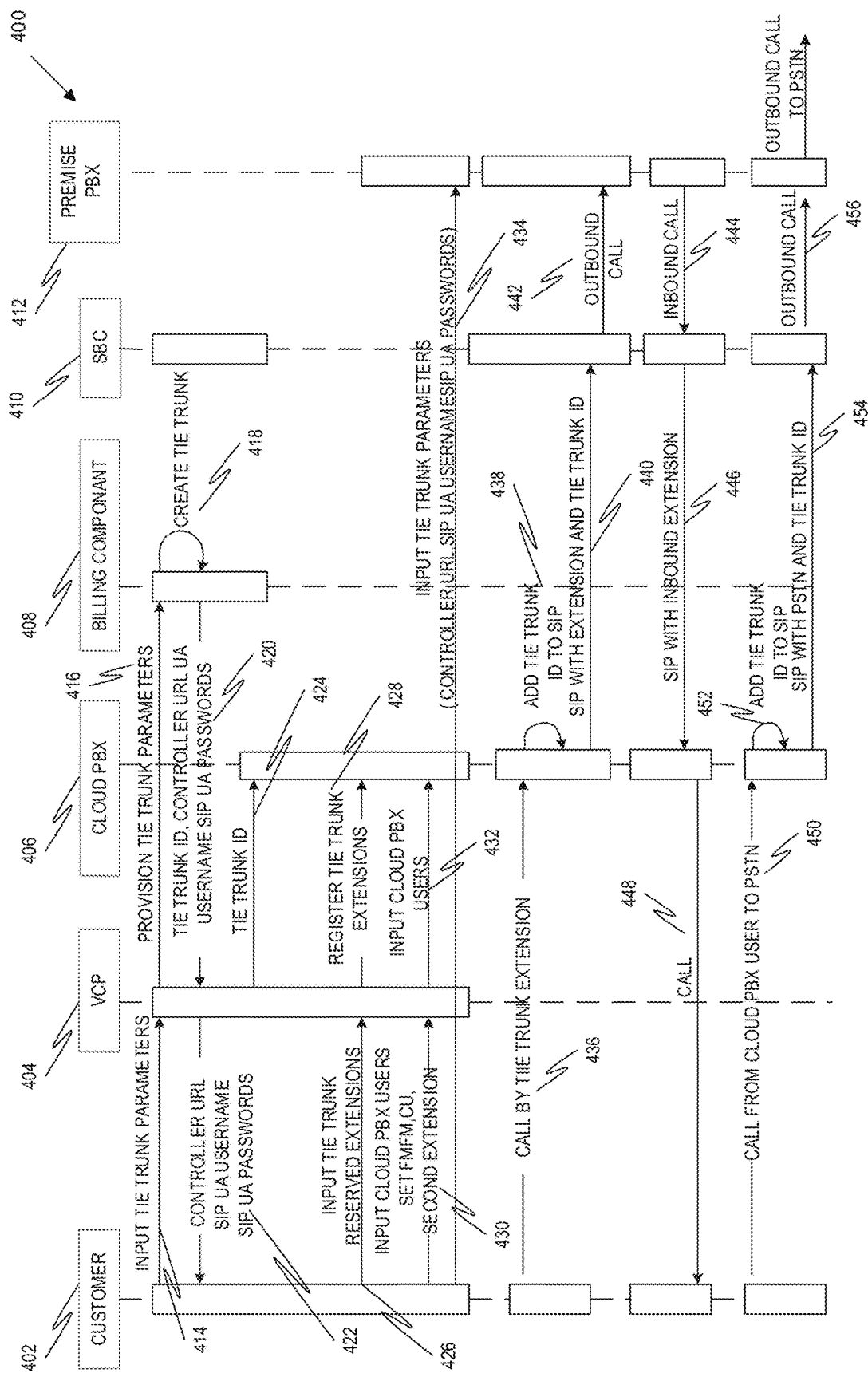
FIG. 4 is a ladder diagram illustrating a workflow in accordance with an example embodiment.

FIG. 4 is a ladder diagram illustrating a workflow 400 in accordance with an example embodiment. This workflow may include customer 402, VCP 404, Cloud PBX 406, billing component 408, session border controller 410, and premise PBX 412. Customer 402 may be an administrator who is setting up the bridging of the Cloud PBX 406 and the premise PBX 412. VCP 404 is a graphical user interface that can be used for configuration.

At operation 414, the customer 402 inputs tie trunk parameters into VCP 404. These parameters may include, for example, a tie trunk name, a PBX type, a codec, and a number of concurrent calls (concurrent call path). At operation 416. VCP 404 then provisions the tie trunk parameters with the billing component 408, which at operation 418 creates the tie trunk. At operation 420, the billing component 408 returns a tie trunk ID, controller uniform resource locator (URL), SIP user agent (UA) username, and SIP UA password. At operation 422, the VCP 404 returns the controller uniform resource locator (URL), SIP user agent (UA) username, and SIP UA password to the customer 402. At operation 424, the VCP 404 transmits the tie trunk ID to the Cloud PBX 406, which may load it into a corresponding entry in a local routing table.

At operation 426, the customer 402 inputs reserved extensions for the tie trunk to the VCP 404. These extensions are reserved for use by users of the premise PBX 412 and thus are not separately used for other users of the Cloud PBX 406. Thus, at operation 428, the VCP 404 registers these tie trunk extensions with the Cloud PBX 406.

At operation 430, the customer 402 inputs cloud PBX users, sets FMFM parameters, calling line ID (CLID) and the assigned bridge. At operation 432, the VCP 404 registers the Cloud PBX users with the Cloud PBX 406. Then, at operation 434, the customer 402 inputs the SIP tie trunk parameters, including the controller URL. SIP UA username, and SIP UA password, into the premise PBX 412.

At operation 436, a call originating from a registered extension is made. In response, the Cloud PBX 406 adds the tie trunk ID to the SIP call request at operation 438, and at operation 440 the Cloud PBX 406 sends the SIP request with the extension and tie trunk ID to the billing component 408 so it can be registered as an outgoing call for billing purposes, at which point at operation 442 the call is made over the premise PBX 412.

At operation 444, an inbound call is received via the premise PBX 412. At operation 446, the billing component 408 attaches the inbound extension to a SIP call request and sends it to the Cloud PBX 406. At operation 448, the Cloud PBX 406 rings the corresponding devices.

At operation 450, a call from a cloud PBX user to a PSTN is received at the Cloud PBX 406. In response, the Cloud PBX 406 adds the tie trunk ID to the SIP call request at operation 452, and at operation 454 the Cloud PBX 406 sends the SIP request with the PSTN and tie trunk ID to the billing component 408 so it can be registered as an outgoing call for billing purposes, at which point at operation 456 the call is made over the premise PBX 412.

Figure 5:
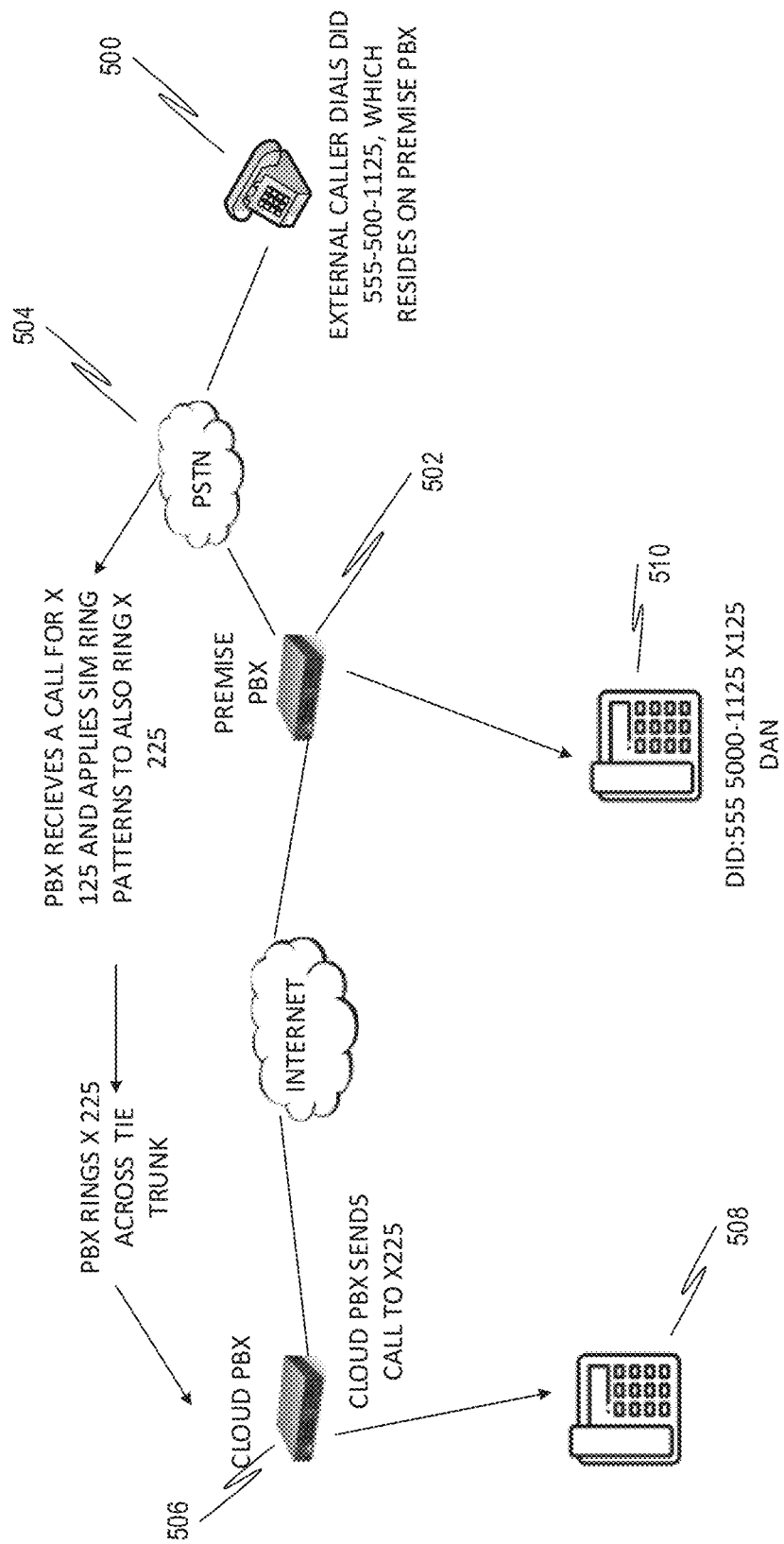
FIG. 5 is a diagram illustrating an example scenario in accordance with an example embodiment.

FIG. 5 is a diagram illustrating an example scenario in accordance with an example embodiment. Here, device 500 is used by an external call to dial a phone number that resides in premise PBX 502. The call is passed through to premise PBX 502 by PSTN 504, premise PBX 502 identifies the extension for the call as being x125 (by using a mapping from the actual number dialed to an extension), which is registered to Dan, and applies a SIM Ring pattern to also ring extension x225, which is an external extension also registered to DAN. This Ring pattern is sent across the tie trunk to Cloud PBX 506. Cloud PBX 506 then looks up the extension in its own tables and determines that device 508 should be rung, while at the same time premise PBX 502 looks up the extension in its own tables and devices that device 510 should be rung. If no answer is detected by premise PBX 502, then it goes to voice mail.

Figure 6:
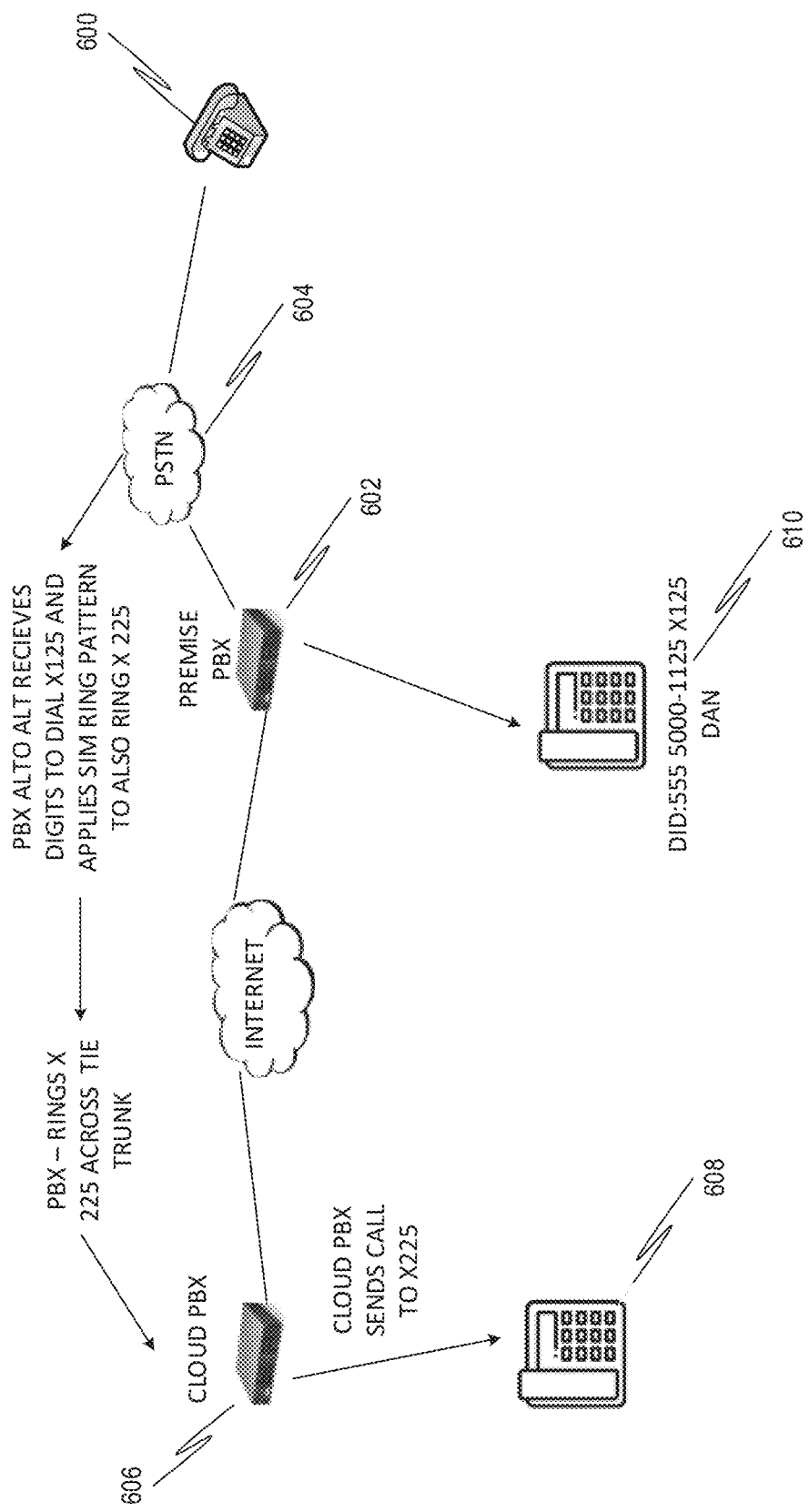
FIG. 6 is a diagram illustrating another example scenario in accordance with an example embodiment.

FIG. 6 is a diagram illustrating another example scenario in accordance with an example embodiment. Here, device 600 is used by an external call to dial a phone number represents a general number for premise PBX 602. The call is passed through to premise PBX 602 by PSTN 604, premise PBX 602 uses an auto attendant to request that the caller enter an extension for the recipient of the call. Once this is identified as being x125, which is registered to Dan, and a SIM Ring pattern to also ring extension x225, which is an external extension also registered to DAN. This Ring pattern is sent across the tie trunk to Cloud PBX 606. Cloud PBX 606 then looks up the extension in its own tables and determines that device 608 should be rung, while at the same time premise PBX 602 looks up the extension in its own tables and devices that device 610 should be rung. If no answer is detected by premise PBX 602, then it goes to voice mail.

Figure 7:
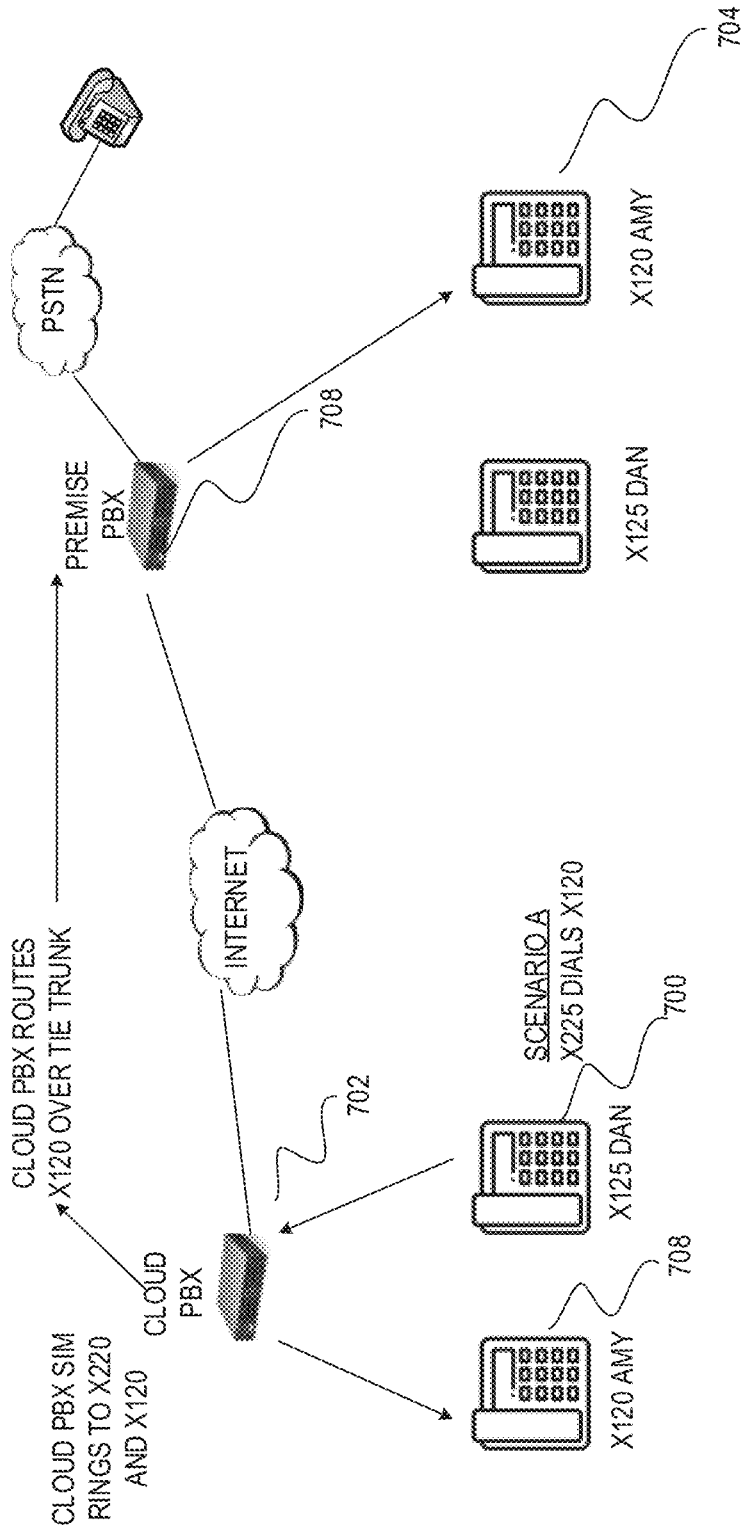
FIG. 7 is a diagram illustrating another example scenario in accordance with an example embodiment.

FIG. 7 is a diagram illustrating another example scenario in accordance with an example embodiment. Here, device 700 is used by Dan to dial extension x120, which is for Amy. Cloud PBX 702 identifies that x120 has a registered cloud PBX device 704 for Amy, and thus begins a ring pattern to ring device 704. Additionally. Cloud PBX 702 passes the call over the SIP tie trunk to PBX 706, which looks up x120 in its own tables and determines that device 708 corresponds to that extension as well, and thus it begins the ring pattern on device 708.

Figure 8:
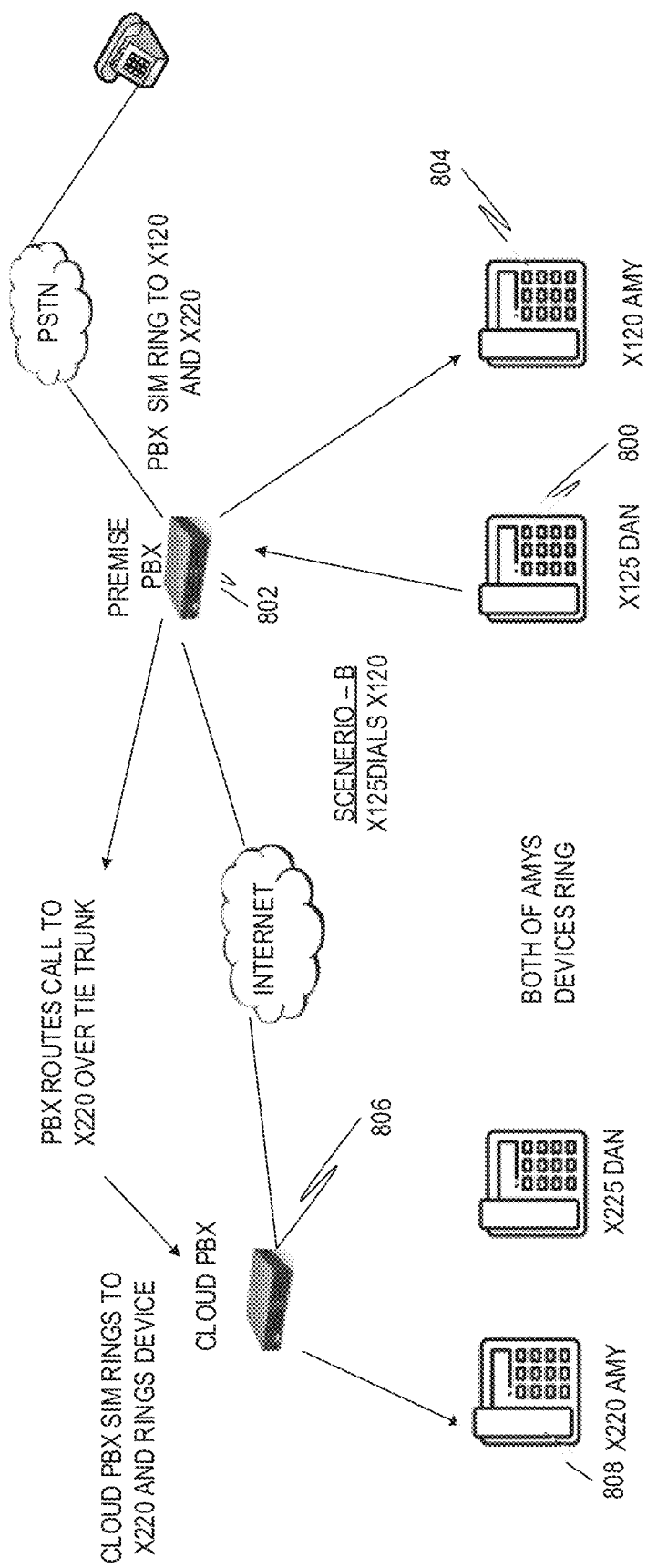
FIG. 8 is a diagram illustrating another example scenario in accordance with an example embodiment.

FIG. 8 is a diagram illustrating another example scenario in accordance with an example embodiment. Here, device 800 is used by Dan to dial extension x120, which is for Amy, premise PBX 802 rings device 804, which corresponds to x120. Additionally, based on its own tables, it also identifies that it should send the call over the tie trunk to extension x220, which then passes the call to Cloud PBX 806. Cloud PBX 806 then identifies that device 808 corresponds to this extension by virtue of being one of potentially several devices that has been registered with the cloud PBX 806 for Amy. Thus it begins a ring pattern to ring device 808.

Figure 9:
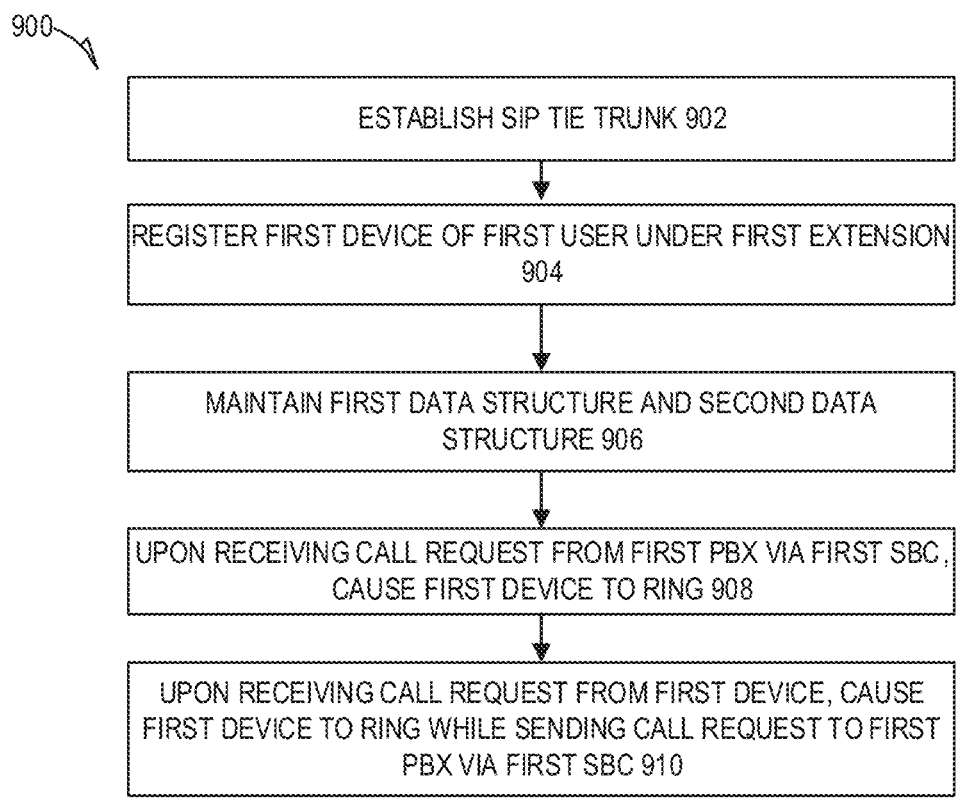
FIG. 9 is a flow diagram illustrating a method for bridging a first PBX and a second PBX, in accordance with an example embodiment.

FIG. 9 is a flow diagram illustrating a method 900 for bridging a first PBX and a second PBX, in accordance with an example embodiment. The first PBX has a plurality of communications devices directly connected via physical cabling but lacking an ability to have any communications devices directly connected to the first PBX via wireless or Internet connections, while the second PBX has the ability to have communications devices directly connected to the second PBX via wireless or Internet connections. At operation 902, a session initiation protocol (SIP) tie trunk is established, via the Internet, to the first private branch exchange (PBX), from a first session border controller connected to the second PBX.

At operation 904, a first device of a first user is registered, using the second PBX, under a first extension, wherein the first user has a second device registered under a second extension with the first PBX. At operation 906, the second PBX also maintains a first data structure indicating that the first device is registered to the first extension and maintain a second data structure indicating that the first extension is associated with the first PBX via the SIP tie trunk. In some example embodiments, both of these data structures are contained within the same data structure.

At operation 908, upon receiving a call request from the first PBX via the first session border controller, the second PBX causes the first device to ring while the first PBX is causing the second device to ring. This is accomplished by accessing the first data structure using an identification of the first extension to identify the first device. At operation 910, upon receiving a call request from the first device, the second PBX causes the first device to ring while sending the call request to the first PBX via a first session border controller. This is accomplished by accessing the second data structure using an identification of the first extension to identify the first PBX and the SIP tie trunk.

Figure 10:
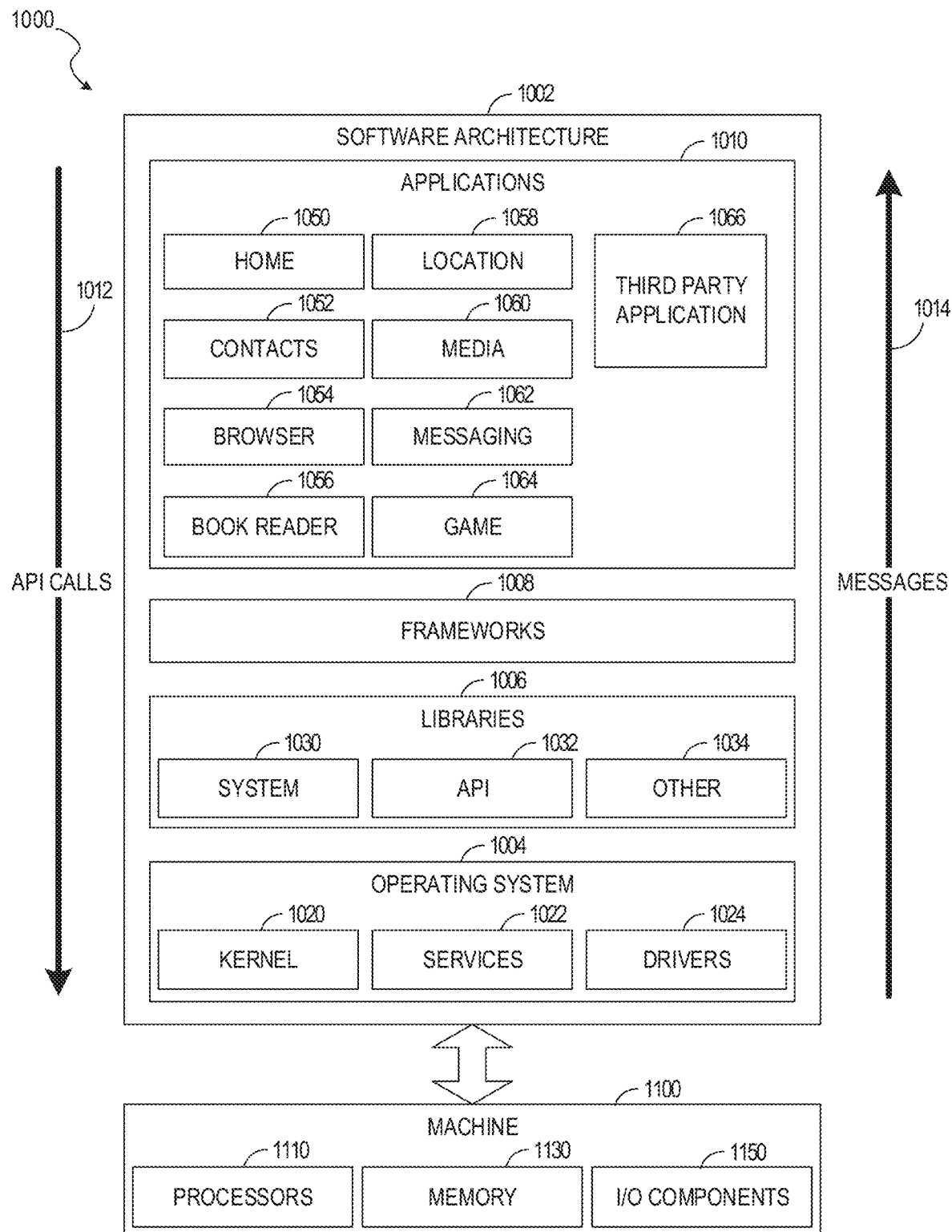
FIG. 10 is a block diagram illustrating a software architecture, which can be installed on any one or more of the devices described above.

FIG. 10 is a block diagram 1000 illustrating a software architecture 1002, which can be installed on any one or more of the devices described above. FIG. 10 is merely a non-limiting example of a software architecture, and it will be appreciated that many other architectures can be implemented to facilitate the functionality described herein. In various embodiments, the software architecture 1002 is implemented by hardware such as a machine 1100 of FIG. 11 that includes processors 1110, memory 1130, and input/output (I/O) components 1150. In this example architecture, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke API calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLU-ETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4). Advanced Video Coding (H.264 or AVC), Moving Picture Experts Group Layer-3 (MP3), Advanced Audio Coding (AAC), Adaptive Multi-Rate (AMR) audio codec. Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various GUI functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications, such as a third-party application 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third-party application 1066 (e.g., an application developed using the ANDROID™ or IOS™ software development kit (SDK) by an entity other than the vendor of the particular platform) may be mobile software running on a mobile operating system such as IOS™. ANDROID™, WINDOWS® Phone, or another mobile operating system. In this example, the third-party application 1066 can invoke the API calls 1012 provided by the operating system 1004 to facilitate functionality described herein.

Figure 11:
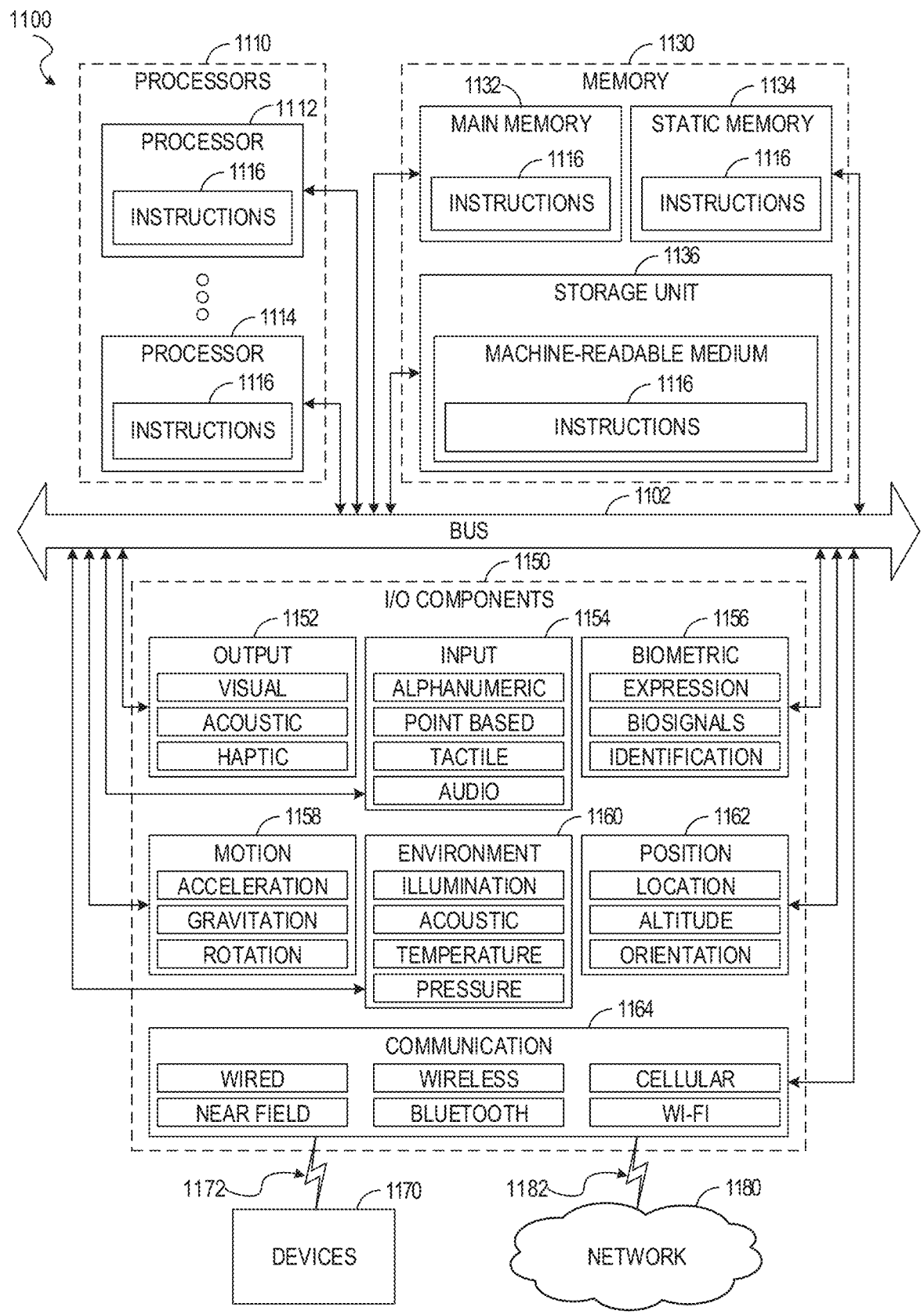
FIG. 11 illustrates a diagrammatic representation of a machine in the form of a computer system within which a set of instructions may be executed for causing the machine to perform any one or more of the methodologies discussed herein, according to an example embodiment.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application 1010, an applet, an app, or other executable code) for causing the machine 1100 to perform any one or more of the methodologies discussed herein may be executed. For example, the instructions 1116 may cause the machine 1100 to execute the method 900 of FIG. 9. Additionally, or alternatively, the instructions 1116 may implement FIGS. 1-9, and so forth. The instructions 1116 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 may include processors 1110, memory 1130, and I/O components 1150, which may be configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors 1110 that may comprise two or more independent processors 1112 (sometimes referred to as "cores") that may execute instructions 1116 contemporaneously. Although FIG. 11 shows multiple processors 1110, the machine 1100 may include a single processor 1112 with a single core, a single processor 1112 with multiple cores (e.g., a multi-core processor), multiple processors 1110 with a single core, multiple processors 1110 with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within the storage unit 1136, within at least one of the processors 1110 (e.g., within the processor's cache memory), or any suitable combination thereof, during execution thereof by the machine 1100.

The I/O components 1150 may include a wide variety of components to receive input, provide output, produce output, transmit information, exchange information, capture measurements, and so on. The specific I/O components 1150 that are included in a particular machine 1100 will depend on the type of machine 1100. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion, and the grouping is in no way limiting. In various example embodiments, the I/O components 1150 may include output components 1152 and input components 1154. The output components 1152 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1150 may include biometric components 1156, motion components 1158, environmental components 1160, or position components 1162, among a wide array of other components. For example, the biometric components 1156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1158 may include acceleration sensor components (e.g., accelerometer), gravitation sensor components, rotation sensor components (e.g., gyroscope), and so forth. The environmental components 1160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1162 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1170 may be another machine or any of a wide variety of peripheral devices (e.g., a peripheral device coupled via a USB).

Moreover, the communication components 1164 may detect identifiers or include components operable to detect identifiers. For example, the communication components 1164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code. Data Matrix, Dataglyph, MaxiCode, PDF417. Ultra Code, UCC RSS-2D bar code, and other optical codes), or acoustic detection components (e.g., microphones to identify tagged audio signals). In addition, a variety of information may be derived via the communication components 1164, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 1130, 1132, 1134, and/or memory of the processor(s) 1110) and/or the storage unit 1136 may store one or more sets of instructions 1116 and data structures (e.g., software) embodying or utilized by any one or more of the methodologies or functions described herein. These instructions (e.g., the instructions 1116), when executed by the processor(s) 1110, cause various operations to implement the disclosed embodiments.

As used herein, the terms "machine-storage medium," "device-storage medium." and "computer-storage medium" mean the same thing and may be used interchangeably. The terms refer to a single or multiple storage devices and/or media (e.g., a centralized or distributed database, and/or associated caches and servers) that store executable instructions 1116 and/or data. The terms shall accordingly be taken to include, but not be limited to, solid-state memories, and optical and magnetic media, including memory internal or Cloud to the processors 1110. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1180 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1×RTT). Evolution-Data Optimized (EVDO) technology, General Packet Radio Service (GPRS) technology. Enhanced Data rates for GSM Evolution (EDGE) technology, third Generation Partnership Project (3GPP) including 3G, fourth generation wireless (4G) networks. Universal Mobile Telecommunications System (UMTS), High-Speed Packet Access (HSPA), Worldwide Interoperability for Microwave Access (WiMAX). Long-Term Evolution (LTE) standard, others defined by various standard-setting organizations, other long-range protocols, or other data-transfer technology.

The instructions 1116 may be transmitted or received over the network 1180 using a transmission medium via a network interface device (e.g., a network interface component included in the communication components 1164) and utilizing any one of a number of well-known transfer protocols (e.g., HTTP). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium." and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A system comprising:
a session border controller configured to establish a session initiation protocol (SIP) tie trunk, via the Internet, to a first private branch exchange (PBX), the first PBX having a plurality of communications devices directly connected via physical cabling but lacking an ability to have any communications devices directly connected to the first PBX via wireless or Internet connections; and
a second PBX having the ability to have communications devices directly connected to the second PBX via wireless or Internet connections, the second PBX configured to register a first device of a user under a first extension, wherein the user has a second device registered under a second extension with the first PBX, the second PBX further configured to maintain a first data structure indicating that the first device is registered to the first extension and maintain a second data structure explicitly identifying the first PBX and the SIP tie trunk.

2. The system of claim 1, wherein the second PBX is further configured to, upon receiving a call request from the first PBX via the session border controller, cause the first device to ring while the first PBX is causing the second device to ring.

3. The system of claim 2, wherein the second PBX causes the second device to ring by accessing the first data structure using an identification of the first extension to identify the first device.

4. The system of claim 1, wherein the second PBX is further configured to, upon receiving a call request from the first device, cause the first device to ring while sending the call request to the first PBX via the session border controller.

5. The system of claim 4, wherein the second PBX sends the call request to the first PBX by accessing the second data structure using an identification of the first extension to identify the first PBX and the SIP tie trunk.

6. The system of claim 1, wherein the first data structure and the second data structure are both part of a single data structure.

7. The system of claim 1, wherein the first PBX is connected to a publicly switched telephone network.

8. A method of bridging a first private branch exchange (PBX) and a second PBX, the method comprising:
establishing a session initiation protocol (SIP) tie trunk, via the Internet, to the first PBX, from a session border controller connected to the second PBX, the first PBX having a plurality of communications devices directly connected via physical cabling but lacking an ability to have any communications devices directly connected to the first PBX via wireless or Internet connections, the second PBX having the ability to have communications devices directly connected to the second PBX via wireless or Internet connections;
registering, using the second PBX, a first device of a user under a first extension, wherein the user has a second device registered under a second extension with the first PBX; and
maintaining a first data structure indicating that the first device is registered to the first extension and maintain a second data structure indicating that the first extension is associated with the first PBX via the SIP tie trunk.

9. The method of claim 8, further comprising, upon receiving a call request from the first PBX via the session border controller, causing, using the second PBX, the first device to ring while the first PBX is causing the second device to ring.

10. The method of claim 9, wherein the second PBX causes the second device to ring by accessing the first data structure using an identification of the first extension to identify the first device.

11. The method of claim 8, further comprising, upon receiving a call request from the first device, causing, using the second PBX, the first device to ring while sending the call request to the first PBX via the session border controller.

12. The method of claim 11 wherein the second PBX sends the call request to the first PBX by accessing the second data structure using an identification of the first extension to identify the first PBX and the SIP tie trunk.

13. The method of claim 8, wherein the first data structure and the second data structure are both part of a single data structure.

14. The method of claim 8, wherein the first PBX is connected to a publicly switched telephone network.

15. A non-transitory machine-readable storage medium comprising instructions, which when implemented by one or more machines, cause the one or more machines to perform operations comprising:
establishing a session initiation protocol (SIP) tie trunk, via the Internet, to a first private branch exchange (PBX), from a session border controller connected to a second PBX, the first PBX having a plurality of communications devices directly connected via physical cabling but lacking an ability to have any communications devices directly connected to the first PBX via wireless or Internet connections, the second PBX having the ability to have communications devices directly connected to the second PBX via wireless or Internet connections;
registering, using the second PBX, a first device of a user under a first extension, wherein the user has a second device registered under a second extension with the first PBX; and
maintaining a first data structure indicating that the first device is registered to the first extension and maintain a second data structure indicating that the first extension is associated with the first PBX via the SIP tie trunk.

16. The non-transitory machine-readable storage medium of claim 15, wherein the operations further comprise, upon receiving a call request from the first PBX via the session border controller, causing, using the second PBX, the first device to ring while the first PBX is causing the second device to ring.

17. The non-transitory machine-readable storage medium of claim 16, wherein the second PBX causes the second device to ring by accessing the first data structure using an identification of the first extension to identify the first device.

18. The non-transitory machine-readable storage medium of claim 15, wherein the operations further comprise, upon receiving a call request from the first device, causing, using the second PBX, the first device to ring while sending the call request to the first PBX via the session border controller.

19. The non-transitory machine-readable storage medium of claim 18 wherein the second PBX sends the call request to the first PBX by accessing the second data structure using an identification of the first extension to identify the first PBX and the SIP tie trunk.

20. The non-transitory machine-readable storage medium of claim 15, wherein the first data structure and the second data structure are both part of a single data structure.

* * * * *